United States Patent [19]
Yamashita

[11] Patent Number: 5,373,885
[45] Date of Patent: Dec. 20, 1994

[54] PNEUMATIC TIRE WITH REDUCED RUNNING NOISE

[75] Inventor: Fumikazu Yamashita, Kobe, Japan

[73] Assignee: Sumitomo Rubber Industries, Ltd., Kobe, Japan

[21] Appl. No.: 207,158

[22] Filed: Mar. 8, 1994

[30] Foreign Application Priority Data

Mar. 22, 1993 [JP] Japan .................... 5-087906

[51] Int. Cl.⁵ .................... B60C 9/18; B60C 9/20
[52] U.S. Cl. .................... 152/527; 152/531; 152/533; 152/538
[58] Field of Search .................... 152/527, 531, 533, 538

[56] References Cited

U.S. PATENT DOCUMENTS

| | | | |
|---|---|---|---|
| 4,202,394 | 5/1980 | van der Burg | 152/531 |
| 4,724,881 | 2/1988 | Poque et al. | 152/531 X |
| 5,032,198 | 7/1991 | Kojima et al. | 152/531 X |
| 5,178,704 | 1/1993 | Hanada et al. | 152/531 X |
| 5,186,773 | 2/1993 | Oku et al. | 152/531 |

Primary Examiner—Jeff H. Aftergut
Assistant Examiner—Adrienne C. Johnstone

[57] ABSTRACT

A radial tire with reduced running noise, which comprises a belt comprising two cross plies of cords laid an angle of 10 to 40 degrees with respect to the tire equator, and a pair of axially spaced narrow dampers disposed radially outside of the belt. Each damper has a width L of 0.1 to 0.36 times the width WBO of the outer belt ply. The dampers are centered on two points P, respectively, each point P being spaced apart from the tire equator towards each side of the tire equator by a distance H of 0.1 to 0.25 times the width WBO of the outer belt ply. The axially inner edge of each damper is spaced apart from the the tire equator by a distance D of 0.05 to 0.2 times the width WBO of the outer belt ply. Each damper is formed by spirally winding a cord so that the windings or turns are substantially in parallel to the tire equator.

4 Claims, 4 Drawing Sheets

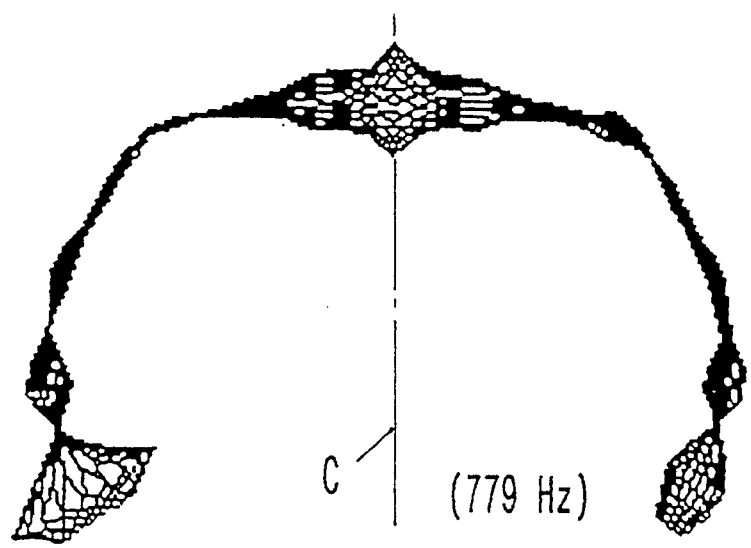
Fig.4 (779 Hz)
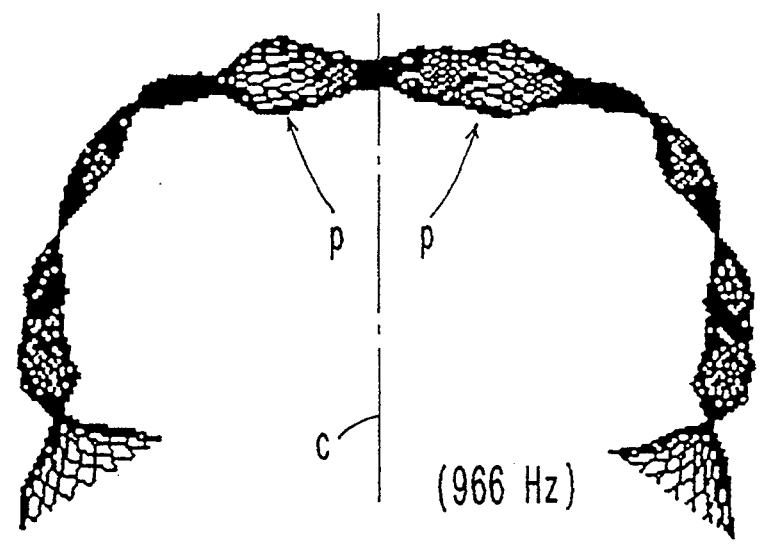
Fig.5 (966 Hz)
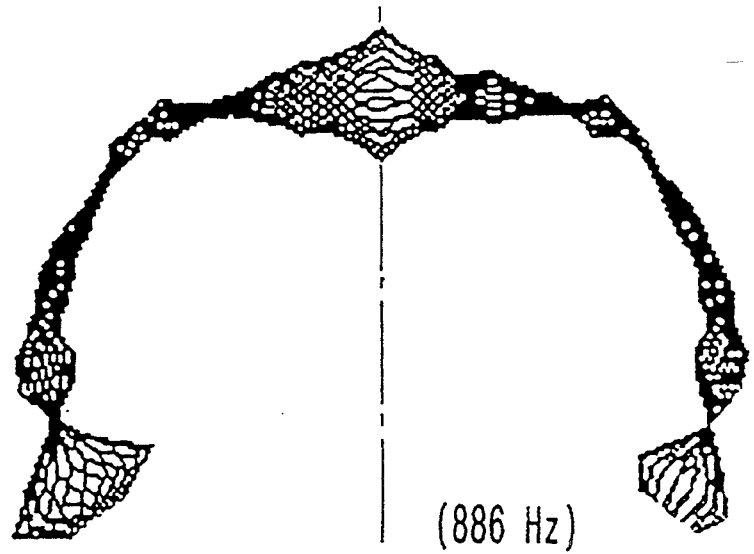
Fig.6 (886 Hz)

PNEUMATIC TIRE WITH REDUCED RUNNING NOISE

The present invention relates to a pneumatic tire, more particularly an improvement in the tread portion of a radial tire to reduce the running noise of the tire.

BACKGROUND OF THE INVENTION

Recently, regulation of automobile running noise has become strict, and there is a great demand for such a tire making less noise as well as being improved in running stability and durability under high speed running.

Hitherto, in order to reduce a running noise of a tire (coasting noise), efforts have been made mainly to improve the tread pattern using a method called pitch-variation. Recently, however, it has become very difficult to reduce the running noise by improving the tread pattern alone. For example, between a low noise tire of which running noise is well reduced by improving the tread pattern and a smooth tire which has a smooth tread surface (a tread pattern is not provided), the difference in noise level is very small.

As a result of studies performed, it was discovered that the tread portion of a tire vibrates during running, and the tread portion itself makes a noise, and further the vibration excite excites the air existing in tread grooves to make a noise called air resonance noise, and that the vibration mode is closely related to the belt disposed in the tread portion.

In a belted radial tire which is provided in the tread portion with a steel cord cross ply belt, one antinode is formed on each side of the time equator at a specific frequency, and this frequency corresponds to the frequency at which the peak of the running noise frequency spectrum lies.

In the tire sizes for passenger car, light van and the like, the peak usually lies in the range of 800 to 1000 Hz as shown in FIG. 7, and the amplitude of vibration becomes maximum around the quarter point (p) as shown in FIG. 5, which point (p) is spaced apart from the tire equator (c) by a distance of ¼ times the tread width.

Incidentally, the above-mentioned vibration mode pattern was obtained as follows. A test tire was vibrated by applying a vibrator to the tread shoulder portion, and the vibration was measured at 10 mm intervals using an acceleration pickup. Then, the data were processed using a Frequency analyzer and a computer to show graphically as shown in FIGS. 4–6.

SUMMARY OF THE INVENTION

It is therefore, an object of the present invention to provide a pneumatic tire, in which running noise is reduced by damping the vibration of the tread portion during running.

According to one aspect of the present invention, a pneumatic tire comprises
a tread portion,
a pair of sidewall portions,
a pair of bead portions, each bead portion having a bead core disposed therein,
a toroidal carcass comprising a carcass ply of radially arranged organic fiber cords extending between the bead portions and turned up around the bead cores,
a bead apex disposed between the main portion and each turned up portion of the carcass,
a belt disposed radially outside the carcass and inside the tread portion and comprising a radially inner wide ply and a radially outer narrow ply,
each of the belt plies composed of cords laid an angle of 10 to 40 degrees with respect to the tire equator so that the belt plies cross each other,
wherein
the tread portion is provided on the radially outside of the belt with a pair of axially spaced narrow dampers,
each of the dampers has a width L of 0.1 to 0.36 times the width WBO of the outer belt ply,
the dampers are centered on two points P, respectively, each point P being spaced apart from the tire equator towards each side of the tire equator by a distance H of 0.1 to 0.25 times the width WBO of the outer belt ply,
the axially inner edge of each damper is spaced apart from the tire equator by a distance D of 0.05 to 0.2 times the width WBO of the outer belt ply,
each damper is formed by spirally winding a cord so that the windings or turns are substantially in parallel to the tire equator.

Therefore, the dampers cover the possible positions of antinodes of vibration, and each damper has a minimum width to damp the vibration. As a result, the running noise caused by vibrations can be reduced, without decreasing the durability and without increasing the tire weight.

BRIEF DESCRIPTION OF THE DRAWINGS

Embodiments of the present invention will now be described in detail in conjunction with the accompanying drawings.

FIG. 4 is a diagram showing a vibration mode of the embodiment tire;

FIGS. 5 and 6 are diagrams showing vibration modes of reference tires; and

DETAILED DESCRIPTION OF THE INVENTION

Figure 1:
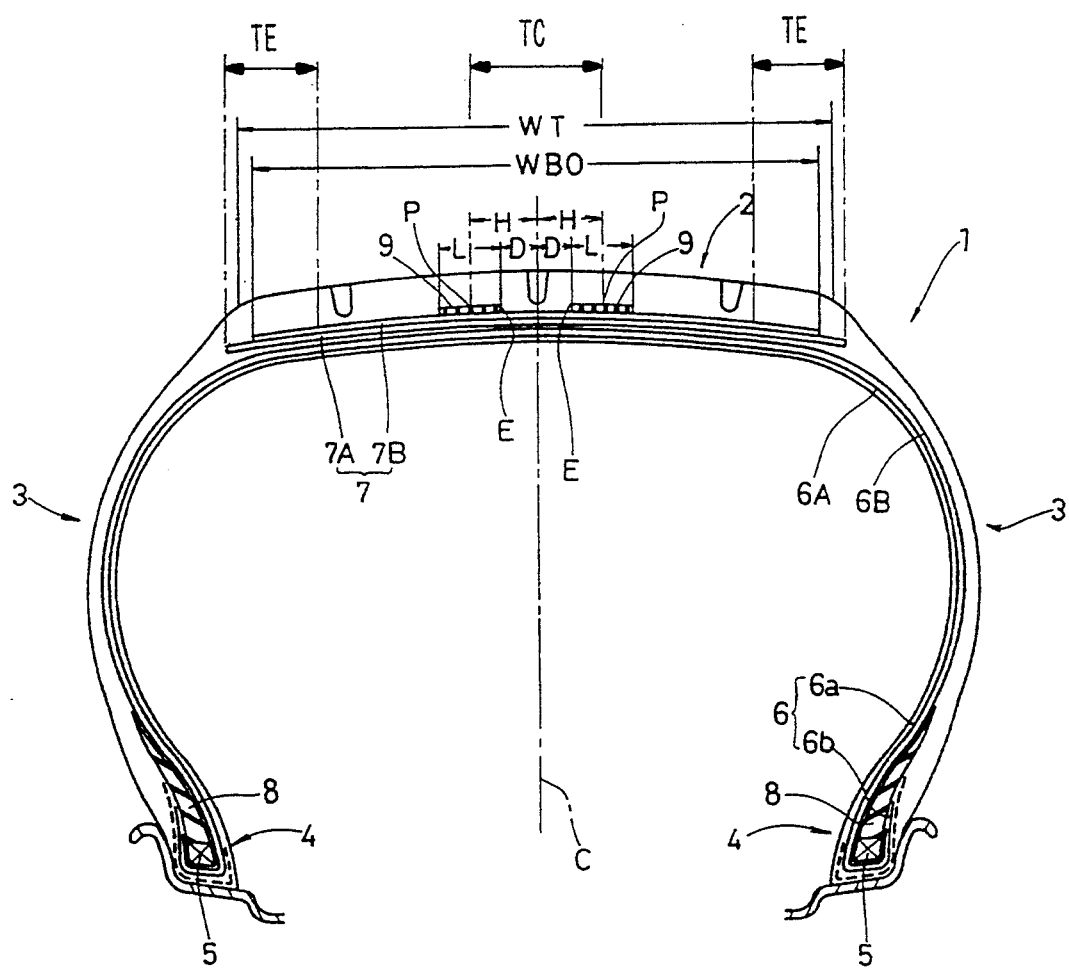
FIG. 1 is a cross sectional view showing an embodiment of the present invention.

In FIG. 1, the pneumatic tire 1 comprises a tread portion 2, a pair of axially spaced bead portions 4, a pair of sidewall portions 3 extending between the tread edges and the bead portions, a carcass 6 and a belt 7.

The carcass 6 has a main portion 6a extending between the bead portions 4 through the tread portion 2 and sidewall portions 3, and a pair of turned up portions 6b turned up around the bead cores 5 from the axially inside to the outside.

The carcass 6 in this embodiment consists of two plies 6A and 6B. Each ply is made of cords arranged radially at an angle of 70 to 90 degrees with respect to the tire equator C to have a radial or semiradial structure.

In the case of a semiradial structure, the carcass cords are inclined so that the cords of the carcass ply 6A cross the cords of the carcass ply 6B.

In this embodiment, the radially outer edge of the turned up portions 6b is lower than the radially outer edge of the bead apex.

Between the main portion 6a and each turned up portion 6b of the carcass 6 in each bead portions, a bead apex 8 is disposed. The bead apex 8 is made of a hard rubber composition extending and tapering radially outwardly from the bead core 5. Further, a camber chafer is disposed along the axially outside of the turned up portion 6b.

For the carcass cords, organic fiber cords, e.g. nylon, polyester, rayon, aromatic polyamide and the like are used.

The belt 7 is disposed radially outside the carcass 6 and inside the tread portion.

The belt 7 consists of a radially inner belt ply 7A disposed adjacently to the radially outside of the carcass 6, and a radially outer belt ply 7B disposed radially outside of the inner belt ply.

Each of the belt plies 7A and 7B is composed of parallel cords laid at a angle of 10 to 45 degrees with respect to the tire equator C so that the cords of the belt ply 7A cross the cords of the belt ply 7B.

Each ply is a cut-end ply, that is, the edges are not folded. The inner belt ply 7A is slightly wider than the outer belt ply 7B.

In this example, the width WBO of the outer belt ply 7B is 0.8 to 0.95 times the tread width WT. If WBO is less than 0.8 times WT, the rigidity of the tread shoulder portions becomes insufficient. If WBO is more than 0.95 times WT, the rubber thickness of the buttress part of the sidewall portions 3 becomes small and liable to be broken.

For the belt cords, steel cords are used, but organic fiber cords, e.g. nylon, polyester, rayon, aromatic polyamide and the like may be used.

According to the present invention, a pair of axially spaced narrow width dampers 9 are disposed radially outside of the outer belt ply 7B.

Each damper 9 is a rubberized cord layer in which at least one spirally wound cord 11 is embedded so that the windings have an angle of not more than 5 degrees with respect to the tire equator C.

The pair of dampers 9 are disposed symmetrically with respect to the tire equator, one on each side of the tire equator.

The center of the width of each damper 9 is located at position P spaced apart from the the tire equator C by a distance H of 0.1 to 0.25 times the width WBO of the outer belt ply 7B.

The width L of each damper 9 is in the range of 0.1 to 0.36 times the width WBO of the outer belt ply 7B.

The axially inner edge E of each damper is positioned at a distance D from the the tire equator in the range of from 0.05 to 0.2 times the width WBO of the outer belt ply 7B.

For the dampers, organic fiber cords, e.g. nylon, polyester, rayon, aromatic polyamide and the like, whose total denier is 1680 to 4500, are used.

Preferably, a hybrid cord composed of a low modulus strand, e.g. nylon fibers and a high modulus strand, e.g. aromatic polyamide fibers which are twisted together is used for the damper cord.

The damper 9 is formed by spirally winding one or cords 11 on the outside of the belt so that the windings have an angle of not more than 5 degrees with respect to the the tire equator C, that is, the windings are substantially parallel to the tire equator C.

Figure 2:
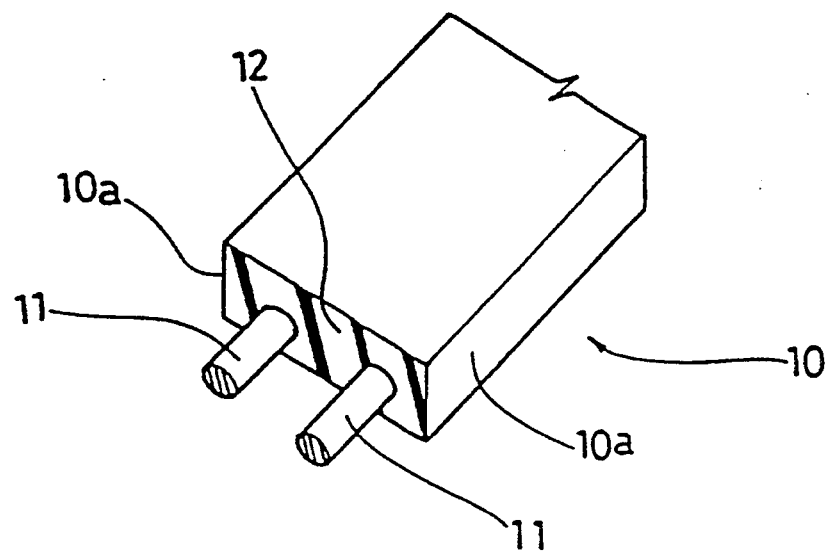
FIG. 2 is a perspective view showing a ribbon used to make the damper.
Figure 3:
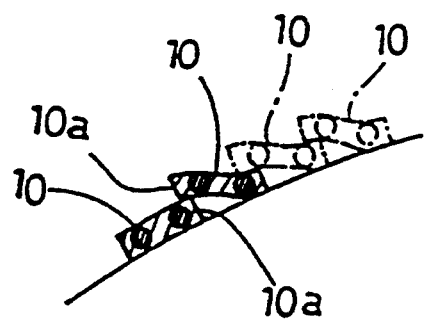
FIG. 3 is a cross sectional view showing an example of the method of winding the ribbon.
Figure 7:
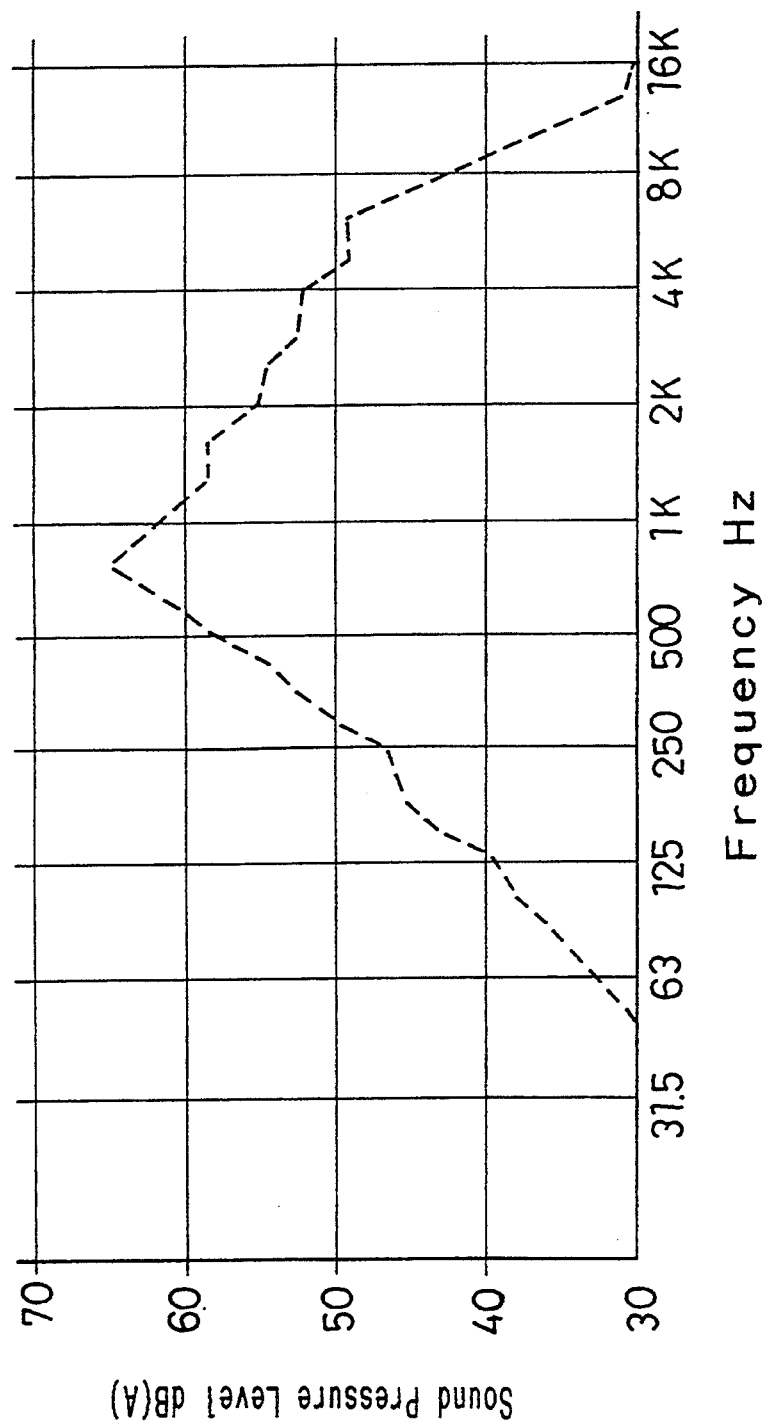
FIG. 7 is a graph showing a typical frequency spectrum of the running noise.

Preferably, the above-mentioned one or more cords 11 to be wound spirally are embedded in a coating rubber 12 in a form of narrow strip or ribbon 10 as shown in FIG. 2. During winding of such ribbon 10, the adjacent side edges 10a of the windings can be overlapped as shown in FIG. 3 in order to prevent the windings of the ribbon 10 from being loosened.

If the damper width L is less than 0.1 times the outer belt ply width WBO, the damper cannot cover the vibrating part of the belt, and cannot damp the vibration. If the damper width L is more than 0.36 times the outer belt ply width WBO, the damper increases the tire weight and sometimes increases the noise level, presenting another vibration mode.

If the distance D of the damper inner edge E is less than 0.05 times the outer belt ply width WBO, the steering stability is deteriorated.

If the distance H of the damper center position P is more than 0.25 times the outer belt ply width WBO, the damper is dislocated from the position of the remarkable antinode. Therefore, the vibrations cannot be effectively damped. If the distance H is less than 0.1 times the outer belt ply width WBO, the steering stability is deteriorated.

The dampers 9 formed by spirally winding the ribbon have no joint in the circumferential direction and the damper cord is continuous in the circumferential direction. Therefore, the rigidity and thickness of the dampers have little variation in the tire circumferential direction, which also helps to reduce the noise.

As the dampers are disposed radially outside of the belt, the expansion of the inner and outer belt plies during high speed running is controlled. Further, the dampers have the spiral structure, in other words, each damper has no splicing. Therefore, the hooping effect is effectively improved.

The above-mentioned hybrid cord presents a low modulus nature under a light load or small tension and a high modulus nature under a heavy load or large tension. Therefore, when the hybrid cords is used in the dampers, the dampers operate as a tight belt during high speed running, while maintaining the tire molding accuracy.

Test tires of size 215/80R18 having the same construction shown in FIG. 1 excepting the dampers were prepared and tested for the following performances.

A) Durability

The tires were mounted on all the wheels of a four-wheel-drive car and run on normal paved roads, and then the running distance until the tread portion was cracked was measured.

The results are indicated by an index based on that Ref.1 is 100. The larger the value, the better the performance. The passing level is 110.

B) High Speed Durability

The test was made according to the procedure specified in JIS-D4230(Sec. 5,4).

The results are indicated by an index based on that Ref.1 is 100. The larger the value, the better the performance. The passing level is 110.

C) Road noise

The tires were mounted on all the wheels of a four-wheel-drive car and run on a test course. The overall noise during coasting was measured with a noise meter. The results are indicated by the difference in sound pressure level from Ref.1. The larger the value, the smaller the noise.

D) Steering Stability

Steering stability was evaluated by a test driver. The results are indicated by an index based on that Ref.1 is 100. The larger the value, the better the performance.

E) Uneven Wear Resistance

The degree of uneven wear after 10,000 kilometer running was evaluated by inspection.

The larger the value, the better the performance. The passing level is 100.

Through the tests, it was confirmed that, in comparison with the reference tires, the example tires are decreased in noise level, with increasing the durability and high speed durability, and without decreasing the uneven wear resistance.

Further, test tires of size 245/70R16 were prepared, and the noise sound frequency spectrum, peak level frequency at which the noise sound pressure level was maximum, and the vibration mode at the peak level frequency were measured. FIG. 4 shows the vibration mode of the tire shown in FIG. 1, wherein the peak level frequency was 779 Hz. FIG. 5 shows the vibration mode of a reference tire having the same construction as FIG. 1 except that the dampers 9 were omitted, wherein the peak level frequency was 966 Hz. FIG. 6 shows the vibration mode of a reference tire having the same construction as FIG. 1 except that three dampers were disposed in the tread center and tread edges (those ranges are shown in FIG. 1 as "TC" and "TE"), wherein the peak level frequency was 886 Hz.

As shown in FIGS. 4, 5 and 6, the vibration of the example tire according to the present invention was well damped, and the vibration of the reference tire with the center and edge dampers was not damped.

Further, the peak level frequency of the example tire became lower than the reference tires. That is, the frequency was changed away from the most sensitive range of 800 to 1000 Hz. As a result, the auditory noise level was remarkably reduced.

The present invention is suitably applied to high-speed tires for four-wheel-drive vehicles such as passenger car and light truck or van.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A pneumatic tire comprising:
   a tread portion,
   a pair of sidewall portions,
   a pair of bead portions, each bead portion having a bead core disposed therein,
   a toroidal carcass comprising a carcass ply of radially arranged organic fiber cords extending between the bead portions and turned up around the bead cores,
   a bead apex disposed between the main portion and each turned up portion of the carcass,
   a belt disposed radially outside the carcass and inside the tread portion and comprising a radially inner ply and a radially outer ply,
   each of the belt plies being composed of cords laid an angle of 10 to 40 degrees with respect to the tire equator so that the belt plies cross each other,
   wherein
   the tread portion is provided on the radially outside of the belt with a pair of axially spaced narrow dampers,
   each of the dampers is formed by spirally winding at least one cord so that the windings thereof are substantially in parallel to the tire equator,
   each of the dampers has a width L of 0.1 to 0.36 times the width WBO of the outer ply,
   the dampers are centered on two points P, respectively, each point P being spaced apart from the tire equator towards each side of the tire equator by a distance H of 0.1 to 0.25 times the width WBO of the outer ply, and
   the axially inner edge of each of the dampers is spaced apart from the tire equator by a distance D of 0.05 to 0.2 times the width WBO of the outer ply.

2. The pneumatic tire according to claim 1, wherein the width WBO of the outer belt ply is in the range of from 0.8 to 0.95 times the tread width WT.

3. The pneumatic tire according to claim 1, wherein the damper cord is made of nylon fibers or aromatic polyamide fibers.

4. The pneumatic tire according to claim 1, wherein the damper cord is made of nylon fibers and aromatic polyamide fibers.

TABLE 1

|  | Ex. 1 | Ex. 2 | Ex. 3 | Ex. 4 | Ex. 5 | Ref. 1 | Ref. 2 | Ref. 3 | Ref. 4 | Ref. 5 | Ref. 6 | Ref. 7 | Ref. 8 | Ref. 9 |
|---|---|---|---|---|---|---|---|---|---|---|---|---|---|---|
| Tread width WT (mm) | | | | | | | | 152 | | | | | | |
| Carcass | | | | | | | | 2 plies | | | | | | |
| Cord | | | | | | | | nylon 2/1890d | | | | | | |
| angle to equator | | | | | | | | 88 deg | | | | | | |
| count (ends/5cm) | | | | | | | | 48.0 | | | | | | |
| Belt | | | | | | | | 2 cross plies | | | | | | |
| Cord | | | | | | | | steel 1 × 5/0.25 | | | | | | |
| angle to equator | | | | | | | | 17 deg | | | | | | |
| Outer belt ply | | | | | | | | | | | | | | |
| WBO (mm) | 144 | 144 | 122 | 122 | 140 | 140 | 147 | 147 | 118 | 118 | 118 | 140 | 140 | 140 |
| WBO/WT | 0.95 | 0.95 | 0.80 | 0.80 | 0.92 | 0.92 | 0.97 | 0.97 | 0.78 | 0.78 | 0.78 | 0.92 | 0.92 | 0.92 |
| Damper | | | FIG. 1 | | | non | | | | | FIG. 1 | | | |
| Cord material | | | aromatic polyamide | | | | | | | | aromatic polyamide | | | |
| denier | 2/840d | | | 3/1500d | | | | | | | 3/1500d | | | |
| angle to equator | | substantially 0 deg | | | 5 deg | | | | | | substantially 0 deg | | | 8 deg |
| H/WBO | 0.10 | 0.25 | 0.25 | 0.20 | 0.20 | | 0.28 | 0.09 | 0.10 | 0.25 | 0.28 | 0.30 | 0.20 | 0.20 |
| L/WBO | 0.10 | 0.36 | 0.10 | 0.18 | 0.20 | | 0.10 | 0.10 | 0.09 | 0.40 | 0.36 | 0.10 | 0.36 | 0.20 |
| D/WBO | 0.05 | 0.07 | 0.20 | 0.11 | 0.10 | | 0.23 | 0.04 | 0.055 | 0.05 | 0.10 | 0.25 | 0.02 | 0.10 |
| Test results | | | | | | | | | | | | | | |
| Durability | 110 | 120 | 110 | 115 | 110 | 100 | 110 | 100 | 100 | 120 | 120 | 105 | 120 | 100 |
| High speed durability | 110 | 120 | 110 | 115 | 110 | 100 | 110 | 100 | 100 | 120 | 120 | 105 | 120 | 100 |
| Road noise decrease dB(A) | 0.2 | 0.5 | 0.2 | 0.2 | 0.2 | 0 | 0 | 0 | 0 | 0.5 | 0.1 | 0 | 0.5 | 0.2 |
| Steering stability | 100 | 100 | 100 | 100 | 100 | 100 | 100 | 90 | 100 | 100 | 100 | 100 | 90 | 100 |
| Uneven wear resistance | 100 | 100 | 100 | 100 | 100 | 100 | 100 | 100 | 90 | 90 | 100 | 100 | 100 | 100 |

* * * * *